United States Patent [19]

Brendel et al.

[11] Patent Number: 5,075,943

[45] Date of Patent: Dec. 31, 1991

[54] HYDROSTATICALLY SUPPORTED ROLL HAVING IMPROVED BENDING CONTROL

[75] Inventors: Bernhard Brendel, Grefrath; Hans J. Preuhs, Willich, both of Fed. Rep. of Germany

[73] Assignee: Eduard Küsters Maschinenfabrik GmbH & Co. KG, Krefeld, Fed. Rep. of Germany

[21] Appl. No.: 370,339

[22] Filed: Jun. 22, 1989

[30] Foreign Application Priority Data

Jun. 22, 1988 [DE] Fed. Rep. of Germany ....... 3821029

[51] Int. Cl.⁵ .............................................. B21B 31/32
[52] U.S. Cl. .................................... 29/113.2; 29/116.2
[58] Field of Search ................. 29/113.1, 113.2, 116.1, 29/116.2

[56] References Cited

U.S. PATENT DOCUMENTS

| | | | |
|---|---|---|---|
| 3,802,044 | 4/1974 | Spillmann et al. | 29/113 |
| 3,885,283 | 5/1975 | Biondetti | 29/116 |
| 4,307,501 | 12/1981 | Ahrweiler | 29/113 |
| 4,328,744 | 5/1982 | Pav et al. | 29/116.2 X |
| 4,729,153 | 3/1988 | Pav et al. | 29/116 |
| 4,848,119 | 7/1989 | Pav et al. | 29/116.2 X |
| 4,856,157 | 8/1989 | Küsters | 29/116.2 |

FOREIGN PATENT DOCUMENTS

| | | |
|---|---|---|
| 0201783 | 11/1986 | European Pat. Off. . |
| 1026609 | 3/1958 | Fed. Rep. of Germany . |
| 2254392 | 12/1976 | Fed. Rep. of Germany . |
| 2230139 | 1/1980 | Fed. Rep. of Germany . |
| 3003395 | 9/1981 | Fed. Rep. of Germany . |
| 3128294 | 2/1983 | Fed. Rep. of Germany . |
| 3625802 | 2/1988 | Fed. Rep. of Germany ..... 29/116.2 |
| 3640902 | 6/1988 | Fed. Rep. of Germany . |
| 2102099 | 1/1983 | United Kingdom . |

Primary Examiner—Mark Rosenbaum
Assistant Examiner—Frances Chin
Attorney, Agent, or Firm—Kenyon & Kenyon

[57] ABSTRACT

A hydrostatically supported roll includes a stationary crosshead, which extends through a rotatable hollow cylinder to form a surrounding clearance space therewith. Annular sealing elements are radially movable in bores provided in the crosshead to sealingly abut the inner circumference of the hollow cylinder. The sealing elements are arranged in diametrically opposing pairs, i.e., they are offset by 180° in the circumferential direction of the roll at the same longitudinal position along the roll. The entire clearance space surrounding the sealing elements is filled with hydraulic fluid at a predetermined pressure, except for the areas in which the sealing elements are present. The interior chamber of one of the sealing elements in each pair can be filled with hydraulic fluid at a higher pressure than the pressure in the clearance space, while the interior chamber of the other one of the sealing elements of each pair can be filled with a hydraulic fluid under a lower pressure than that in the clearance space. In this manner, the individual forces of the sealing elements in a pair produce a net increased, resultant force in the same direction that acts against the hollow cylinder.

10 Claims, 1 Drawing Sheet

HYDROSTATICALLY SUPPORTED ROLL HAVING IMPROVED BENDING CONTROL

BACKGROUND OF THE INVENTION

The invention is related generally to rolls for treating webs of material and, more particularly, to a hydraulically supported roll having improved bending control.

In DE-OS 3640902, a hydraulically supported roll having bending control is disclosed in which the roll comprises a rotatable hollow cylinder, which forms the working roller circumference at its outer diameter, and a stationary crosshead extending lengthwise through the hollow cylinder to form a surrounding clearance space with the inner circumference of the hollow cylinder. The clearance space between the inner circumference of the hollow cylinder and the crosshead is completely filled, i.e., over 360° viewed from the circumferential direction, with hydraulic fluid under a controllable pressure. Annular sealing elements arranged in a row along the crosshead are provided in the active plane. These sealing elements can be moved radially similar to a piston/cylinder unit until their circular sealing rim abuts the inner circumference of the hollow cylinder. The interior of the sealing element can be filled with hydraulic fluid. If the fluid in the interior of the sealing element is at a pressure that is higher than the pressure prevailing in the clearance space, then a positive force, which corresponds to the excess pressure, is exerted by the sealing elements against the inner circumference of the hollow cylinder. On the other hand, the interior of sealing element may be filled with hydraulic fluid at a pressure that is lower than the pressure prevailing in the clearance space. In this case, the pressure in the clearance space predominates and the zone located on the side opposite the sealing element, i.e., the zone 180° circumferentially offset from the sealing element, exerts a positive force corresponding to the differential pressure against the inner circumference of the hollow cylinder. By suitably selecting the pressure in the sealing elements (when the pressure in the clearance space remains constant), the hollow cylinder, for example, can be pressed against a counterroll at one time and lifted from the counterroll, at another time, for instance, to enable a web to be fed into the roll nip. The construction of the sealing elements required for this type of operation is disclosed in DE-OS 3640902, which is a counterpart foreign application to U.S. application Ser. No. 07/126,773, filed Nov. 30, 1987, now U.S. Pat. No. 4,856,157 the disclosure of which is incorporated by reference herein.

When the hollow cylinder is pressed against a counterroll, a line pressure develops having a distribution dependent upon the pressures in the sealing elements. These sealing elements can be controlled individually or separately in groups. In one embodiment of a roll disclosed in DE-OS 3640902 and the above-mentioned application, the sealing elements, whose internal pressure can be lowered below that of the clearance space, are arranged on the side of the crosshead opposite the roll nip. Also, in order to modify the line pressure distribution on the side facing the roll nip, additional sealing elements, not at the same longitudinal position as the above-discussed sealing elements, are provided on the side of the crosshead facing the roll nip. The additional sealing elements can exert a positive force on the inner circumference of the hollow cylinder in the direction of the roll nip.

DE-AS 2230139 and EP 0201783 disclose rolls having sealing elements that can only exert a positive force against the inner circumference of the roll and in which the sealing elements are mounted in two rows offset by 180° (viewed from the circumferential direction of the roller) such that the sealing elements mutually oppose each other in pairs.

The invention is particularly directed to a roll having an "internal stroke" in which the hollow cylinder is supported for radial movement, as a whole, relative to the crosshead. Such an arrangement is disclosed in DE-AS 2254392. The invention began with the realization of the problem that the dynamic effect of a sealing element whose internal pressure can be lowered below that of the clearance space is restricted by this internal pressure. If need be, the pressure in the sealing element can be lowered to zero. Then, on the opposite side of the cylinder, the pressure prevailing in the clearance space acts on the surface corresponding to the surface of the sealing element, i.e., the diametrically opposed surface. In many cases, however, it is desirable to exert a higher pressure at a specific roll location, for example, in order to influence the line pressure distribution at specific locations.

SUMMARY OF THE INVENTION

The invention is directed to the problem of providing greater forces than heretofore possible in controllable deflection rolls that have sealing elements whose pressure can be lowered below that of the clearance space.

The invention solves this problem by providing a flexure-controllable roll having a rotatable hollow cylinder forming a working roll circumference at its outer diameter, a stationary crosshead extending lengthwise through the hollow cylinder to form a surrounding clearance space with an inner circumference of the hollow cylinder, and first means for supplying hydraulic fluid under a controllable pressure to at least one longitudinal area in the clearance space. At least one pair of diametrically opposed piston-like sealing elements is mounted for radial movement, in an active plane of the roll, in cylinder bores provided in the crosshead at the longitudinal area in the clearance space. A contact surface is formed on each sealing element for sealingly abutting the inner circumference of the hollow cylinder and an interior chamber is formed within each sealing element for receiving hydraulic fluid and producing a force directed against the hollow cylinder. Second means for supplying hydraulic fluid under a controllable pressure to each interior chamber is provided such that the pressure in the interior chamber of one of the sealing elements of the pair is greater than the pressure in the clearance space and the pressure in interior chamber of the other sealing element of the pair is lower than the pressure in the clearance space.

By arranging both sealing elements of one pair at the same longitudinal position, but at diametrically opposed sides of the crosshead and by using different operating methods, i.e., by supplying increased pressure, relative to the pressure in the clearance space, to one of the sealing elements and decreased pressure to the other, the individual forces produce an increased net force acting against the hollow cylinder. The sealing elements of each pair do not counteract each other, but rather act in the same direction against the hollow cylinder. Thus, the cylinder can be forced against a counterroll at specific locations corresponding to the location of pairs of sealing elements and pulled away from the counterroll with a considerably greater force than heretofore possible. In perhaps the simplest embodiment of the invention, a pair of sealing elements is provided at one roll location along longitudinal direction of the roll.

The invention also provides for hydraulic supply via pumps and a controlling system such that the sealing elements of each pair can be alternatively supplied with hydraulic fluid having a pressure that is either higher or lower than the pressure prevailing in the clearance space. In this manner, the direction of the net force of the sealing element can be reversed so that at a specific location, the roll can alternatively be pressed against or pulled away from the roll nip.

The greatest range of effects results when all of the sealing elements of the roll are provided in diametrically opposed pairs and operated such that each time the pressure of one sealing element of a pair is higher than the pressure prevailing in the clearance space, the pressure of the other sealing element is lower than this pressure. For instance, the entire roll may be equipped with sealing elements of the above-mentioned type and the line pressure in the roll nip may be produced exclusively by these sealing elements. However, the invention is not limited to this specific type of construction. It also is possible to produce the line pressure in a specific longitudinal section of the roll by different means. This can be done, for example, by using an S-roll chamber in accordance with the German Patent 1026609, while also adding a sealing element pair constructed according to the invention to locally influence the separately generated line pressure. In this case, transverse seals may be provided in the immediate vicinity of the pair of sealing elements. The transverse seals would form an annular space, in which the diametrically opposed sealing elements, i e., offset by 180° in the circumferential direction, would just fit. Normally, however, the entire clearance space is filled with hydraulic fluid over the length of the roll and the transverse seals are provided at the ends of the hollow cylinder.

An especially important practical application of the invention can be used to obviate undesirable compression effects at the edges of a web conducted through the roll gap. In some cases, the line pressure of a pair of rollers requires corrective action at the edges of the web to make treatment as uniform as possible over the entire width of the web. As it turns out, often the edge correction can not be adequately performed without difficulty, when conventional bending control means are applied at the center of the width of the web. If additional sealing elements of the conventional type are mounted outside of the width of the web to correct for edge effects, the force of a single sealing element often does not suffice to accomplish the desired correction. When two or more of these types of sealing elements must be provided outside each edge of the web, the length of the roll is detrimentally increased to enable performance of the edge correction. If one or two pairs of the increased force producing type of sealing elements of the invention are disposed on each end of a roll that requires edge correction, the required forces can be achieved with a smaller additional length than heretofore possible.

Further advantages, features and embodiments of the invention are apparent from consideration of the following detailed description, drawings and appended claims.

DETAILED DESCRIPTION

Figure 1:
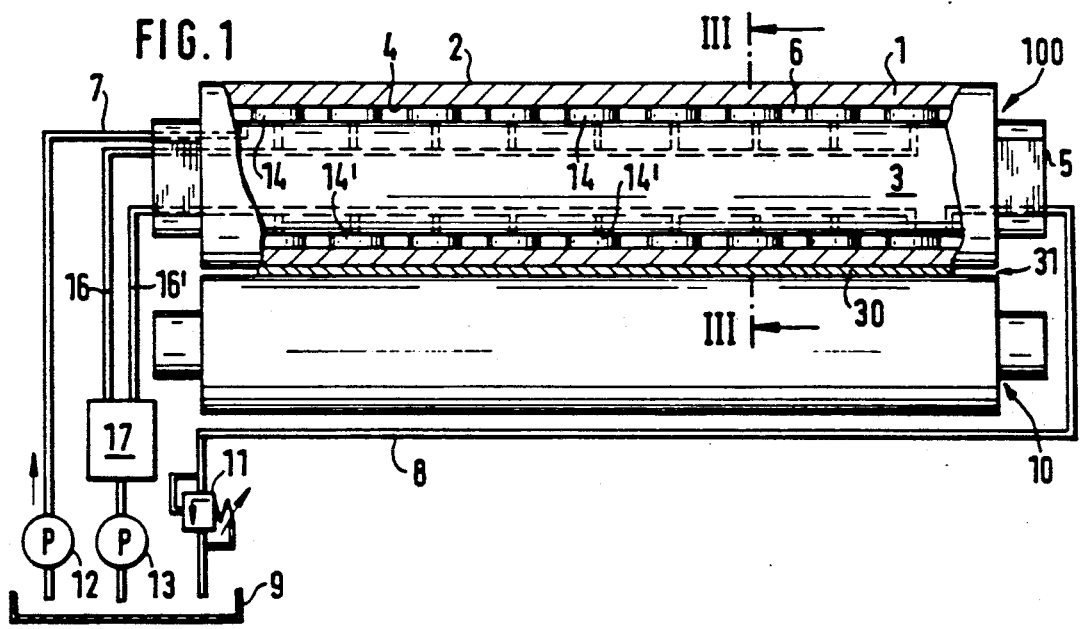
FIG. 1 shows a longitudinal view, partly in section, of a pair of rollers constructed according to the principles of the invention.
Figure 2:
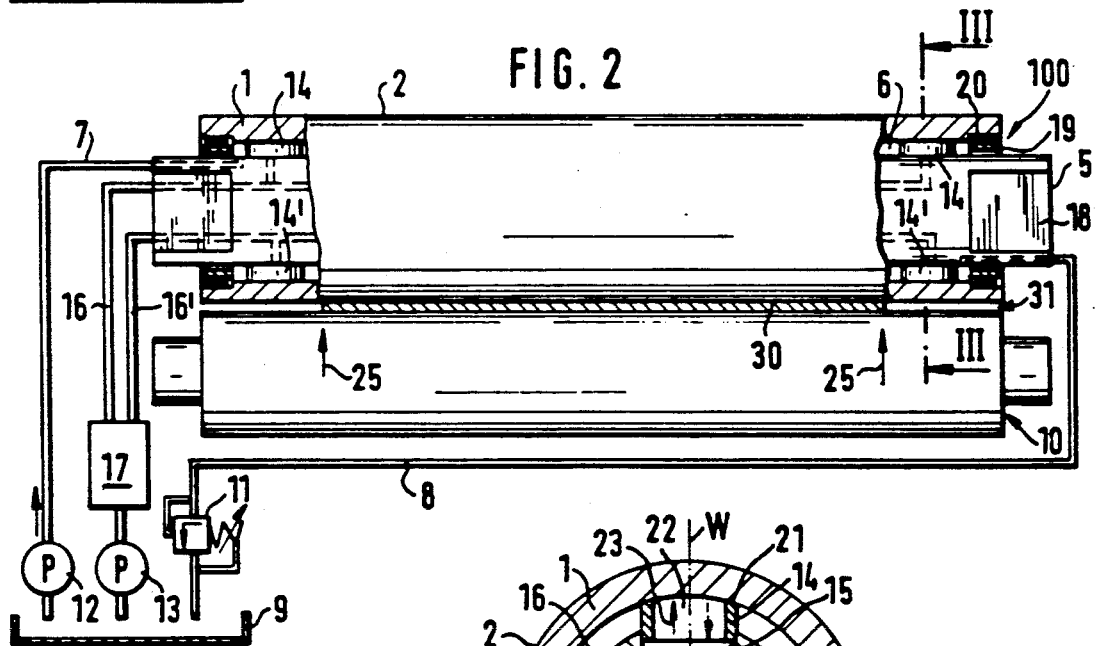
FIG. 2 shows a view corresponding to FIG. 1 of a modified embodiment of the invention.

The pairs of rolls schematically represented in FIGS. 1 and 2 each comprise a bottom roll 10 and a top roll 100, forming a roll nip or gap 31 between which a web of material 30, such as a fabric, is conducted for pressure treatment in the roll nip 31. The bottom roll 10 may be a conventional solid roll, while the top roll 100 comprises a rotatable hollow cylinder 1, whose outer circumference 2 forms the working roll circumference. A stationary crosshead 3 extends lengthwise through the cylinder 1 to form an annular clearance space with the inner circumference 4 of the hollow cylinder 1. This clearance space enables the crosshead 3 to bend inside the hollow cylinder 1 without coming into contact with the inner circumference 4, and also permits the hollow cylinder 1 to shift radially as a whole toward the bottom roller 10 with use of the bearing support arrangement discussed below.

Figure 3:
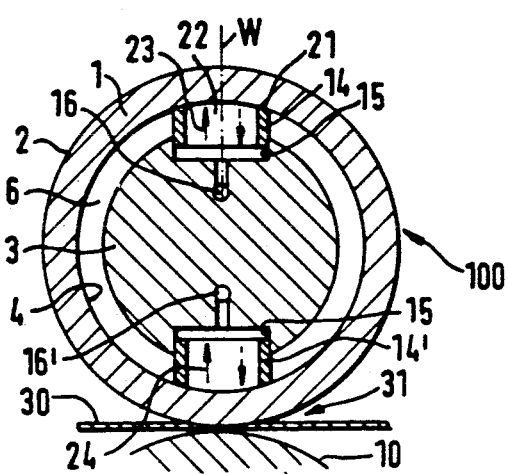
FIG. 3 shows a cross sectional view, in an enlarged scale taken along lines III—III of FIGS. 1 and 2.

The journals of the bottom roller 10, as well as the ends 5 of the crosshead 3 protruding out of the hollow cylinder 1, are secured in a cylinder stand or similar support structure. The ends 5 of the crosshead 3 are flattened on mutually opposing sides such that flat surfaces 18 (FIG. 2) are formed, which are parallel to each other and to the active plane W (FIG. 3). A guide ring 19 surrounds each end 5 and contacts the flat surfaces 18. The guide ring 19 has a cutaway portion having boundary edges, which are parallel to each other and slide on the guide surface 18 in the vertical direction of FIG. 2, i.e., in a direction parallel to the active plane W. The guide ring 19 is radially spaced from the end 5 of the crosshead 3. The hollow cylinder 1 is rotatably supported on the guide ring 19 by way of a bearing 20 such that the guide ring only performs its guidance function in a direction perpendicular to the active plane and allows the hollow cylinder 1 to move relative to the crosshead 3 in a direction parallel to the active plane W.

The clearance space 6 between the crosshead 3 and the inner circumference 4 of the hollow cylinder 1 is sealed at the ends by transverse end seals (not shown) and can be filled with hydraulic fluid by means of a supply line 7 and pump 12, which draws fluid from a supply tank 9. The hydraulic fluid pumped to space 6 recirculates via a line 8 back into the supply tank 9. The supply line 7 discharges into the clearance space 6 on the left roll end shown in FIG. 1, while the return line 8 is connected to space 6 on the right end of the roll. In this manner, a flow in the longitudinal direction of the space 6 results, which produces a uniform hollow cylinder temperature, when the recirculating hydraulic fluid also is used to adjust the roll temperature. A relief valve 11 is mounted in the line 8 to maintain a predetermined pressure in the clearance space 6.

Annular sealing elements 14,14' are guided for radial movement in cylinder bores 15 formed in the top and bottom sides of the crosshead 3. The sealing elements have a top contact surface, formed by an annular boundary 21, which tightly abuts the inner circumference 4 of the hollow cylinder 1 to form an interior chamber 22. The pump 13, which draws hydraulic fluid from the supply tank 9, may supply hydraulic fluid to a controlling system 17 at a greater pressure than that at which pump 12 operates. The controlling system uses the hydraulic fluid pumped thereto and appropriate regulating valves to produce pressures in lines 16,16', which can be adjusted from zero up to the maximum value of the pump 13 by any manner known in the art. Fluid at such an adjusted pressure is supplied through the line 16 to the sealing elements 14, while fluid at another pressure is supplied through the line 16' to the sealing elements 14'. Nine pairs of sealing elements 14,14' are depicted in the FIG. 1 embodiment. However, other numbers of sealing elements may be used as well. The sealing elements 14, 14' may be pressurized, individually or separately in groups, with hydraulic fluids of varying pressure. In such a case, the lines 16,16' schematically represent a plurality of single lines, which lead to the individual sealing elements 14,14' or to groups of such sealing elements. In practice, the sealing elements 14,14' do not necessarily have to be designed in a simple ring shape apparent from FIG. 3. Other shapes are possible as well.

The pressure generated by the pump 12 and the relief valve 11 prevails throughout the clearance space 6, except for the interior of the sealing elements 14,14'. The clearance space has no longitudinal partitions whatsoever, such that, were it not for the presence of the sealing elements, the pressure in space 6 would have no dynamic effect upon the hollow cylinder 1 that would cause the cylinder to become displaced or to exert forces in the active plane W. In such a state, the hollow cylinder 1 would only be "inflated" by the pressure in the space 6, without producing any other outwardly visible effects. The area upon which the pressure is exerted by the hydraulic fluid in the space 6, however, is modified by the presence of sealing elements 14,14'.

First of all, it is important that one sealing element 14' on the bottom side of the crosshead 3 lie exactly diametrically opposed at the same longitudinal position as a sealing element 14 on the top side of the crosshead, i.e., offset by 180° in the circumferential direction. It is also important that the controlling system 17 be able to provide a pressure greater than the pressure of the hydraulic fluid in the space 6, which can be maintained in one of the sealing elements 14,14', and a lower pressure than the pressure of the hydraulic fluid in the space 6, which can be maintained in the other opposed sealing element. If a pressure greater than the pressure in the space 6 is produced, for example, in the sealing element 14 of FIG. 3, then an upwardly directed positive force is exerted against the inner circumference 4 of the hollow cylinder 1 at the location of the sealing element 14. This force is designated with the arrow 23. If the opposite facing sealing element 14' is connected to a fluid source having a lower pressure than the pressure in the clearance space 6, the pressure in the clearance space 6 within the zone enclosed by the sealing element 14' is reduced and a net upwardly directed force 24 results, which acts against the hollow cylinder 1. Thus, although the sealing elements 14,14' are operated differently, i.e., contain fluids at different pressure, the resulting forces 23,24 are directed in the same direction and resolve to produce an increased, upwardly directed, resultant force.

When the sealing elements 14,14' are constructed such that sealing elements can function both as "underpressure" and "overpressure" elements, i.e., the pressure in the sealing element selectively can be, both above, as well as below, the pressure in the clearance space 6 at different times, a reversed dynamic effect can be produced by reversing the operating method discussed above, as is indicated by the dotted arrows in FIG. 3. In this manner, the forces from the pair of sealing elements 14,14', are now directed downward toward the roll nip 31 to produce an increased, downwardly directed, resultant force. Sealing elements that can function both as an underpressure and overpressure element are disclosed in the assignee's copending U.S. application Ser. No. 07/126,773, entitled Roll With Controllable Line Pressure, now U.S. Pat. No. 4,856,157, and in the assignee's copending U.S. applications, Ser. No. 07/370,348, entitled Improved Sealing Element For A Hydrostatically Supported Roll and Ser. No. 07/372,540 entitled Hydrostatically Supported Roll With A Damping Device. The disclosure of these applications is incorporated by reference herein.

By taking advantage of the resultant force of one pair of sealing elements 14,14' when they are operated differently as discussed above, the force exerted on the hollow cylinder 1 can be raised, in an area corresponding to the longitudinal position of the sealing elements 14,14', above the limits that would normally be possible by use of a single sealing element mounted only on one side of the crosshead. Thus, the sealing element arrangement of the invention can be used to increase the line force exerted by a roll 100 provided with sealing elements 14,14' over its the entire length or to reduce the hydrostatic pressures required to attain a specific line force. However, it is also possible to provide, in this manner, only one or two localized influences on the line force, especially, as shown in the embodiment depicted in FIG. 2.

FIG. 2 shows a web 30, whose edges lie at 25, being treated in the nip formed between the rollers 10,100. The internal construction of the roll in the area within the width of the web is intentionally omitted in FIG. 2, because its specific construction is not constrained, but can vary. However, on each side the roller 100 in FIG. 2, a pair of sealing elements 14,14' is provided outside of the web width defined by the web edges 25,25, which form first and second outer edges of the web, respectively. These sealing elements can be operated as described above and the line pressure distribution at the edge of the web 30 can be influenced, for example, to avoid an edge compression effect. The pair of sealing elements 14,14' at each roll end can introduce a considerable force at their longitudinal position against the hollow cylinder 1, thereby allowing the line pressure distribution to be adjusted to correct for edge compression. Heretofore, several sealing elements arranged side by side, which would detrimentally increase the length of the roller 100, might be required to provide enough force to accomplish this result.

What is claimed is:

1. A flexure-controllable roll comprising:
   a rotatable hollow cylinder forming a working roll circumference at its outer diameter;
   a stationary crosshead extending lengthwise through the hollow cylinder to form a surrounding clearance space with an inner circumference of the hollow cylinder;

first means for supplying hydraulic fluid under a controllable pressure to at least one longitudinal area in the clearance space;

at least one pair of diametrically opposed piston-like sealing elements mounted for radial movement, in an active plane of the roll, in cylinder bores provided in the crosshead at said at least one longitudinal area;

a contact surface formed on each sealing element for sealingly abutting the inner circumference of the hollow cylinder;

an interior chamber formed within each sealing element for receiving hydraulic fluid and producing a force directed against the hollow cylinder; and second means for supplying hydraulic fluid under a controllable pressure to each interior chamber such that the pressure in the interior chamber of one of the sealing elements of the pair is greater than the pressure in the clearance space and the pressure in the interior chamber of the other sealing element of the pair is lower than the pressure in the clearance space.

2. The roll of claim 1 wherein said first means for supplying hydraulic fluid under a controllable pressure comprises a first pump supplying hydraulic fluid to the clearance space at a first pressure.

3. The roll of claim 2 wherein said second means for supplying hydraulic fluid to each interior chamber comprises a second pump supplying hydraulic fluid at a second pressure greater than said first pressure and a controlling system receiving hydraulic fluid from said second pump via a supply line.

4. The roll of claim 3 wherein said second means further comprises first and second conduits, each having one end connected to said controlling system and another end communicating with one of the interior chambers of said at least one pair of diametrically opposed sealing elements, said controlling system including means for supplying hydraulic fluid at said second pressure to one of said first and second conduits and means for supplying hydraulic fluid at a third pressure less than said first pressure to the other of said first and second conduits, whereby the pressure in the interior chamber of one of said at least one pair of sealing elements is greater than the first pressure and the pressure in the interior chamber of the other of said at least one pair of sealing elements is less than the first pressure.

5. The roll of claim 4 wherein said at least one pair of diametrically opposed sealing elements comprises a plurality of pairs of diametrically opposed sealing elements radially movable in respective cylinder bores provided along the length of the crosshead.

6. The roll of claim 1 wherein said at least one pair of diametrically opposed sealing elements comprises a plurality of pairs of diametrically opposed sealing elements radially movable in respective cylinder bores provided along the length of the crosshead.

7. The roll of claim 1 further comprising a counterroll closely spaced to said hollow cylinder to form a roll nip therebetween and wherein said at least one pair of diametrically opposed sealing elements is provided at a first end of the crosshead that lies outside a first outer edge of a web conducted through the roll nip.

8. The roll of claim 7 wherein said at least one pair of diametrically opposed sealing elements comprises a second pair of sealing elements provided at a second end of the crosshead that lies outside a second outer edge of the web.

9. The roll of claim 4 further comprising a counterroll closely spaced to said hollow cylinder to form a roll nip therebetween and wherein said at least one pair of diametrically opposed sealing elements is provided at a first end of the crosshead that lies outside a first outer edge of a web conducted through the roll nip.

10. The roll of claim 9 wherein said at least one pair of diametrically opposed sealing elements comprises a second pair of sealing elements provided at a second end of the crosshead that lies outside a second outer edge of the web.

* * * * *